United States Patent
Pfeiffer

(10) Patent No.: US 12,093,686 B2
(45) Date of Patent: Sep. 17, 2024

(54) CODE MAINTENANCE SYSTEM

(71) Applicant: SAP SE, Walldorf (DE)

(72) Inventor: Stefan Pfeiffer, Heidelberg (DE)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 17/952,671

(22) Filed: Sep. 26, 2022

(65) Prior Publication Data
US 2024/0103853 A1    Mar. 28, 2024

(51) Int. Cl.
*G06F 8/71*    (2018.01)
*G06F 8/30*    (2018.01)
*G06F 11/36*   (2006.01)

(52) U.S. Cl.
CPC .................. *G06F 8/71* (2013.01); *G06F 8/30* (2013.01); *G06F 11/3636* (2013.01)

(58) Field of Classification Search
CPC ........... G06F 8/71; G06F 8/30; G06F 11/3636
See application file for complete search history.

(56) References Cited

U.S. PATENT DOCUMENTS

| | | | | |
|---|---|---|---|---|
| 5,067,073 A * | 11/1991 | Andrews | ................. | G06F 11/34 714/E11.212 |
| 6,282,701 B1 * | 8/2001 | Wygodny | ........... | G06F 11/3664 709/224 |
| 8,224,874 B2 * | 7/2012 | Guo | ........................ | G06F 3/067 707/816 |
| 8,751,508 B1 * | 6/2014 | Peracha | ................. | G06F 16/907 705/26.7 |
| 8,806,433 B2 * | 8/2014 | Phan | ......................... | G06F 8/20 717/127 |
| 9,038,033 B1 * | 5/2015 | Hidayat | ................... | G06F 8/33 717/129 |
| 9,720,659 B2 * | 8/2017 | Bhogal | ...................... | G06F 8/24 |
| 9,740,505 B2 * | 8/2017 | Webb | ........................ | G06F 8/31 |
| 10,055,762 B2 * | 8/2018 | Liu | ..................... | G06Q 30/0267 |
| 10,120,714 B1 * | 11/2018 | Cabrera | .................... | G06F 9/50 |
| 11,693,633 B2 * | 7/2023 | ChoFleming, Jr. | ....... | G06F 8/34 717/109 |
| 2009/0138847 A1 * | 5/2009 | Beckwith | ................ | G06F 9/449 717/108 |
| 2009/0210688 A1 * | 8/2009 | Kohiga | .................. | G06F 8/4434 713/1 |
| 2012/0072887 A1 * | 3/2012 | Basak | ................... | G06F 11/323 717/123 |
| 2012/0143694 A1 * | 6/2012 | Zargahi | .............. | G06Q 30/0603 705/14.66 |
| 2013/0111032 A1 * | 5/2013 | Alapati | ................. | G06F 9/5072 709/226 |
| 2018/0173520 A1 * | 6/2018 | Golding | .................... | G06F 8/71 |
| 2023/0376287 A1 * | 11/2023 | Dsouza | ............... | G06F 9/44521 |

* cited by examiner

*Primary Examiner* — Douglas M Slachta
(74) *Attorney, Agent, or Firm* — Buckley, Maschoff & Talwalkar LLC

(57) ABSTRACT

Systems and methods provide identification of a code artifact, determination of logical entities of the code artifact, determination of references between the logical entities of the code artifact, determination, based on the determined references, of one or more methods of the code artifact that are referenced by no logical entities of the code artifact, and identification of ones of the one or more methods which were not executed by a production system by searching a code execution trace for each of the one or more methods.

17 Claims, 7 Drawing Sheets

```
package com.successfactors.ecchecksconsistency.processing.core.jobinfo;

import java.util.ArrayList;
import java.util.Collections;
import java.util.List;

import com.successfactors.ecchecksconsistencycheck.api.annotations.CheckImplExecutor;
import com.successfactors.ecchecksconsistencycheck.api.configuration.CheckBaseObject;
import com.successfactors.ecchecksconsistencycheck.api.executors.QuickFixExecutable;
import com.successfactors.ecchecksconsistencycheck.api.quickfix.FixExecutor;
import com.successfactors.ecchecksconsistency.baseobjects.core.jobinformationBO;
import com.successfactors.ecchecksconsistency.ecchecksconsistency.modules.CoreModule;
import com.successfactors.ecchecksconsistency.processing.core.checkexecutor.CheckExecutorEffectiveLatestChangeNotNull;
import com.successfactors.ecchecksconsistency.processing.core.jobinfo.fix.FixTriggerJobInitializeEffectLatestChangeInJobInfo;

@CheckImplExecutor(checkModule = CoreModule.class)
public class EffectiveLatestJobChangeNotNull extends CheckExecutorEffectiveLatestChangeNotNull implements QuickFixExecutable {

@Override
    public String getTableName() {
        return "EMP_JOB_INFO_T";
    }

@Override
    public String getIDColumnName() {
        return "JOB_INFO_ID";
    }

@Override
    public String getChange() {
        return "JOB";
    }

@Override
    public CheckBaseObject getCheckBaseObject() {
        return new JobInformationBO();
    }

@Override
    public List<FixExecutor> getFixExecutors() {
        return new ArrayList<>(Collections.singleton(new FixTriggerJobInitializeEffectLatestChangeInJobInfo()));
    }
}
```

FIG. 5

CODE MAINTENANCE SYSTEM

BACKGROUND

The development of software applications is typically governed by a formal development lifecycle. For example, a software developer may develop a section of code (i.e., a code artifact) and test the code artifact independently. Once the code artifact is deemed complete, the developer submits the code artifact to a centralized repository for code review. Code review may comprise checking code quality (e.g., with respect to industry and organizational standards) and identifying functional defects, performance issues and/or security issues. The code artifact is deployed to a production system after resolution of all issues identified by the code review.

Eventually, it may be desirable to revise the deployed code artifact. The revision may be occasioned by a change in requirements or a desire to re-implement functions provided by certain portions of the code artifact. Developers typically do not delete pre-existing code during such revisioning. The pre-existing code is not deleted because, due to the complexity of modern software development, the developer is usually not confident that deleting the code will not break some existing functionality of the code artifact. Additionally, the developer wants to avoid removing portions of code whose methods which might be called from other portions of the code artifact.

Even if the developer was confident that removing certain code would not break existing functionality, and that the code is not called from other parts of the artifact, the developer could still not be sure that the code is not called during system operation. For example, public methods can be accessed/called from other software components, for example over APIs, using dependency injection (DI) and similar techniques. Conventional development environments are not aware of this usage and will therefore not identify such methods as removable, out of an abundance of caution. Accordingly, after multiple revisions, a code artifact may become cluttered and difficult to comprehend.

Consequently, a code artifact may include code which is never executed at run-time. The existence of this "dead" code increases the difficulty of further development, maintenance and bug fixes. The increased difficulty increases the resource overhead associated with the code artifact and decreases developer productivity.

Systems are desired to facilitate the identification of code which is not executed at run-time. Such systems preferably identify code which can be removed from a code artifact without breaking references to methods of the code artifact, so that the code artifact can still be built and the software application in which it is used can still execute properly.

BRIEF DESCRIPTION OF THE DRAWINGS

FIG. 5 illustrates a code execution trace according to some embodiments.

DETAILED DESCRIPTION

The following description is provided to enable any person in the art to make and use the described embodiments. Various modifications, however, will remain readily-apparent to those in the art.

Some embodiments facilitate the identification of source code of a code artifact which is not executed at run-time. Manual, semi-automated, or fully-automated systems may be executed to remove the identified source code from the code artifact according to some embodiments.

Briefly, some embodiments operate to identify references between logical entities within source code. Methods within the source code which are not referenced by any logical entities are determined based on the references. A code execution trace is acquired which represents run-time execution of the source code in a production system. Based on the code execution trace, methods which are not referenced by any logical entities and which are not executed at run-time are identified. The portions of the source code which include the thusly-identified methods may therefore be considered dead code and removed from the source code.

Advantageously, embodiments allow for efficient identification and (if desired) removal of code which is unused within a code artifact and which is not called by external components without requiring a developer to understand the function or purpose of the removed code. Embodiments may also be applied to source code written in any programming language.

Figure 1:
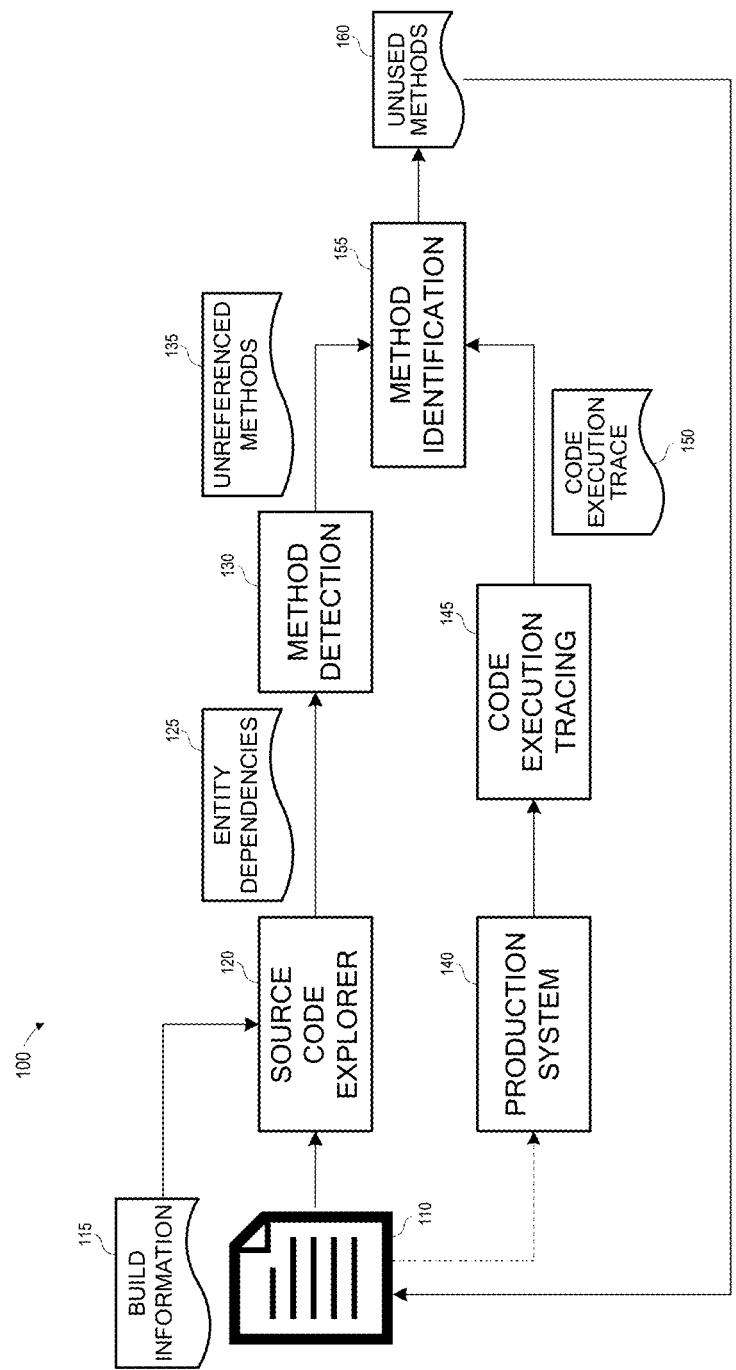
FIG. 1 is a block diagram of a system to identify unused methods within source code according to some embodiments.

FIG. 1 is a block diagram of architecture 100 according to some embodiments. Architecture 100 facilitates the identification of un-referenced and un-executed methods within source code. Such methods will be referred to as "unused methods" herein. Architecture 100 is a logical architecture and may be implemented in any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented as a cloud service (e.g., Software-as-a-Service, Platform-as-a-Service) using cloud-based resources, and/or other systems which apportion computing resources elastically according to demand, need, price, and/or any other metric.

Code artifact 110 may conform to any programming language and/or application structure that is or becomes known. Code artifact 110 may comprise a module, project, library, application, interface or any other suitable collection of source code. Code artifact 110 may be compilable into executable program code (e.g., machine code) which is executed to cause a computing system to perform one or more functions. Code artifact 110 may be generated in any manner that is or becomes known. In one typical example, a developer operates an integrated development environment (IDE) (not shown) to create code artifact 110.

As is known in the art, a developer may also associate code artifact 110 with build information 115. Build information 115 includes information used to compile, assemble and link code artifact 110 as intended by the developer into an executable software application. Build information 115 may, for example, specify libraries and/or other code artifacts which should be linked with code artifact 110 after compilation and assembly thereof.

Code artifact 110 and build information 115 are input to source code explorer 120. Source code explorer 120 may comprise any system (e.g., a cloud-based service) which is capable of identifying logical entities within source code and references therebetween. Examples of source code explorer 120 include but are not limited to Sourcetrail and Sourcegraph.

Entity dependencies 125 may comprise a list of nodes representing each logical entity of code artifact 110, and references therebetween. Each node may be associated with a type, e.g., Java file, text document, method, variable. A particular node may be a source node (i.e., references an associated node), a target node (i.e., referenced by an associated node), both, or neither.

Method detection component 130 receives entity dependencies 125 and determines unreferenced methods 135 based thereon. According to some embodiments, method detection component 130 determines all nodes which are associated with methods, for example by identifying those nodes of entity dependencies 125 which are associated with the type method. Next, to identify unreferenced methods 135, detection component 130 identifies those method-type nodes which are not the target node of an association with any other node. This identification according to some embodiments is explained in more detail below.

Production system 140 executes program code which was built using code artifact 110. Production system 140 executes code artifact 110 as intended by the developer of code artifact 110, as deployed to actual customers or in a test environment. For example, code artifact 110 may be a component of a software application executing on production system 140. Production system 140 may comprise a landscape of various software applications, databases and services accessible to designated users.

Production system 140 provides usage logs to code execution tracing component 145 as is known in the art. Examples of code tracing execution component 145 include but are not limited to Splunk and Datadog. Code execution tracing component 145 generates code execution trace 150 from these usage logs. Code execution trace 150 indicates which lines of code artifact 110 were executed by production system 140.

Code execution trace 150 and unreferenced methods 135 are received by method identification component 155. In some embodiments, method identification component 155 searches code execution trace 150 for each unreferenced method of unreferenced methods 135. Upon locating an unreferenced method in code execution trace 150, method identification component 155 determines, based on code execution trace 150, whether the lines of code artifact 110 corresponding to the unreferenced method were executed by production system 140. If not, method identification component 155 adds the unreferenced method to unused methods 160. Accordingly, unused methods 160 consists of methods of code artifact 110 which are not referenced by any logical entities of code artifact 110 and which are not executed by production system 140. The use of code execution trace 150 advantageously allows identification of methods of code artifact 110 which are not referenced by any logical entities of code artifact 110 but which are called by other code executed by production system 140.

As illustrated in FIG. 1, code artifact 110 may be modified based on identified unused methods 160. In one example, a developer is provided with a list of unused methods 160 which may include corresponding line numbers of code artifact 110. The developer may then delete (or comment out) the lines of the unused methods. In some embodiments, an automated system may delete the lines of code artifact 110 corresponding to unused methods 160. Such an automatically-modified code artifact 110 may also be submitted to a version control system for incorporation into production system 140.

Figure 2:
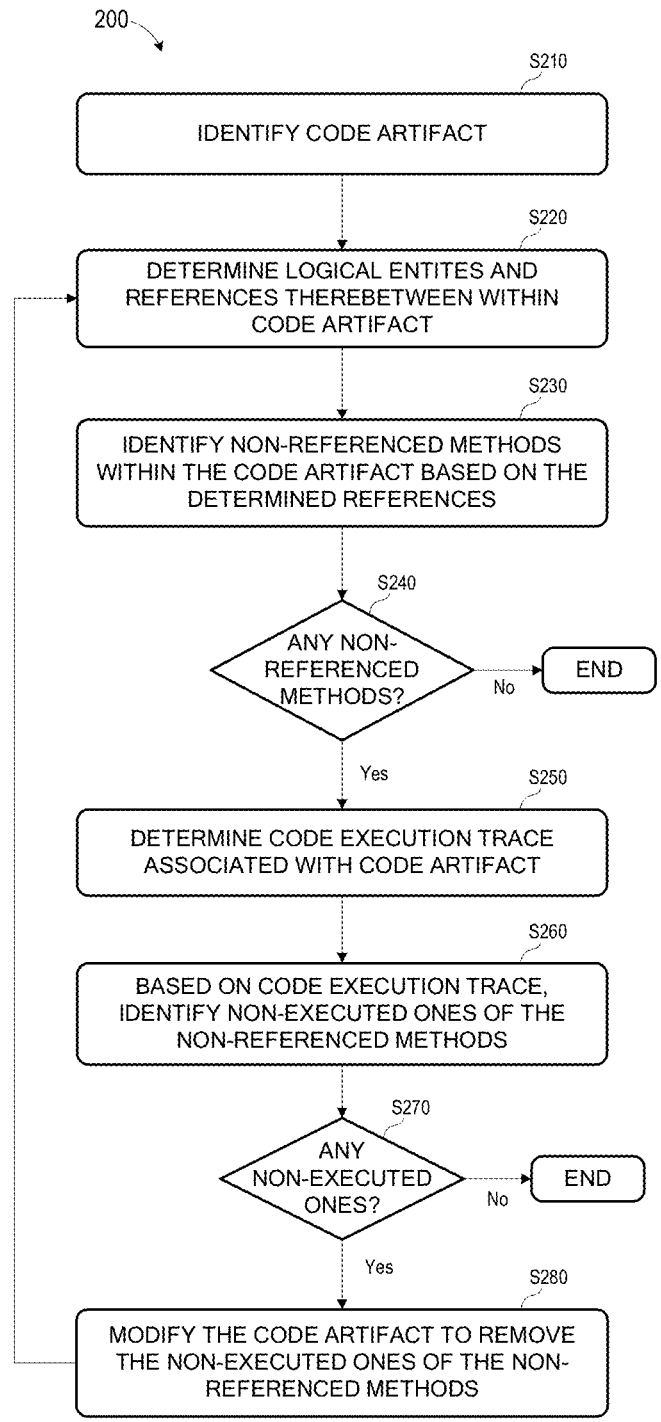
FIG. 2 is a flow diagram of a process to identify unused methods within source code according to some embodiments.

FIG. 2 is a flow diagram of process 200 to describe the identification of unused methods as depicted in FIG. 1 according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, and a magnetic tape, and executed therefrom. Embodiments are not limited to the examples described below.

A code artifact is identified at S210. As noted above, the code artifact may conform to any programming language and/or application structure, and may comprise a module, project, library, application, interface or any other suitable collection of source code. The code artifact may be identified at S210 by an integrated development environment operated by a developer in some embodiments.

Figure 3:
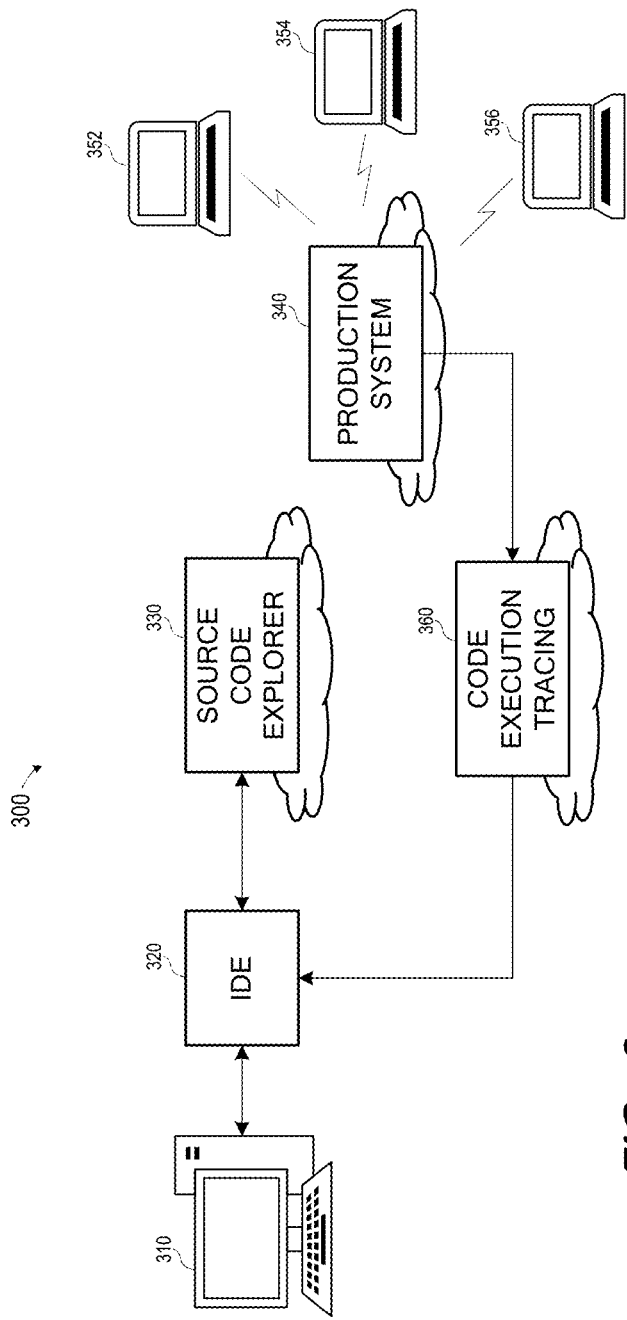
FIG. 3 illustrates a hardware landscape to identify unused methods within source code according to some embodiments.

FIG. 3 is a diagram of system 300 implementing process 200 according to some embodiments. System 300 may also or alternatively comprise an implementation of architecture 100 of FIG. 1. System 300 includes developer computing system 310 which may comprise a desktop computer, a laptop computer, a tablet computer, a smartphone, or any other computing device capable of communicating with integrated development environment 320 and presenting a user interface to a developer. In some embodiments, computing system 310 executes a client application of IDE 320, which may be a standalone application or a Web application executed within a virtual machine of a Web browser executed by computing system 320.

IDE 320 provides an environment for writing and debugging source code, and may also provide compiling functions. IDE 320 may be cloud-based, requiring a developer operating computing system 310 to log in to a cloud account in order to access IDE 320. IDE 320 may be in communication with a code repository from which computing system 310 may check-out code artifacts in order to review or modify the source code thereof, and to check-in modified code artifacts.

Returning to process 200, a developer may operate a user interface of IDE 320 to select or otherwise identify a particular code artifact at S210. It will be assumed that the identified code artifact is a component of a software application which is currently executing in a production system as described above.

Next, at S220, all references to all methods within the code artifact are determined. In some embodiments, IDE 320 includes functionality to identify all such references. According to system 300, IDE 320 calls source code explorer 330 at S220 to request determination of all logical entities within the code artifact and the references therebetween. The request may include the code artifact and build information associated with the code artifact and/or links thereto.

Source code explorer 330 may use the build information to compile the code artifact and identify the logical entities and the references within the code artifact as is known in the art. Source code explorer 330 is depicted as a cloud-based service but embodiments are not limited thereto. For example, source code explorer 330 may be installed and executed by a same on-premise computer server which executes IDE 320.

Source code explorer 330 provides the requested logical entities and references to IDE 320. The logical entities may be provided as a list of nodes, with each node exclusively corresponding to a single logical entity and including the name of the entity. Each node may also identify the type of its corresponding logical entity. The references may comprise data indicating source-target associations between nodes, wherein the logical entity corresponding to a "source" node references the logical entity corresponding to a "target" node.

Figure 4:
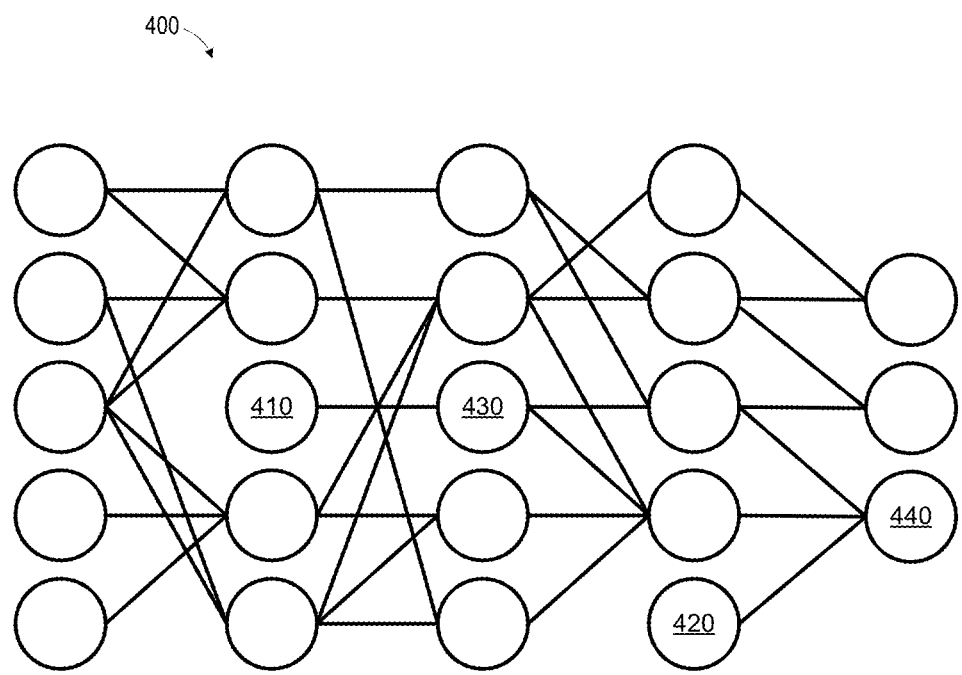
FIG. 4 is a graph of entities representing the structure of source code according to some embodiments.

Non-referenced methods within the code artifact are identified at S230 based on the determined references. FIG. 4 shows graph 400 indicating references between logical entities of a code artifact according to some embodiments. Each circle of graph 400 represents a logical entity, or node, and each line between nodes, or edge, represents a reference between nodes. Graph 400 may be constructed by source code explorer 330 or by IDE 320 based on information received from source code explorer 330.

For purposes of the present example, nodes 410, 420, 430 and 440 represent methods, while the other nodes of graph 400 represent other types of logical entities. A method detection component of IDE 320 may identify these method-representing nodes at S230 based on a node type value assigned thereto by source code explorer 330. Next, those method-representing nodes which are not referenced by any other node are identified at S230.

Using graph 400 as an example, an unreferenced logical entity is represented by a node which is not associated with an incoming (i.e., from left to right) edge. Of nodes 410, 420, 430 and 440 which represent methods, nodes 410 and 420 are not associated with an incoming edge and are therefore identified at S230 as representing unreferenced methods.

Continuing the present example, flow proceeds from S240 to S250 because non-referenced methods were identified at S230. A code execution trace associated with the code artifact is determined at S250.

It will be assumed that production system 340 executes program code which was built using the code artifact identified at S210. Production system 340 is depicted as a cloud-based system and may include many disparate applications and services. During operation, production system 340 serves requests received from users operating computing devices such as devices 352, 354 and 356.

Production system 340 provides usage logs to code execution tracing system 360 at S250. The usage logs indicate processes executed by production system 340 during operation. Code execution tracing component 360 generates a code execution trace based on the usage logs as is known in the art. The code execution trace indicates the lines of the identified code artifact were executed by production system 340. The code execution trace is provided to IDE 320 in some embodiments.

At S260, a method identification component of IDE 320 searches the code execution trace to identify non-referenced methods which were not executed during operation of production system 340. As noted above, the code execution trace allows determination of the line numbers of the code artifact which were not executed. FIG. 5 is a representation of Java source code 500 of a code artifact according some embodiments. Based on code execution trace, source code 500 has been enriched with flags 510 to indicate which lines of source code 500 were not executed.

It will be assumed that unreferenced node 420 is associated with the method "getIDColumnName( )" of source code 500. Accordingly, the code artifact of source code 500 is searched at S260 for the method "getIDColumnName( )". Upon locating the lines of code associated with the method (i.e., lines 25 and 26), it is then determined whether these lines are associated with a flag indicating that the lines were not executed. In the present example, the lines are not associated with such a flag and therefore it is determined that unreferenced method "getIDColumnName( )" was executed by production system 340. In other words, lines 25 and 26 do not contain dead code.

It will now be assumed that unreferenced node 410 is associated with the method "getChange( )" of source code 500. The code artifact of source code 500 is searched at S260 for the method "getChange( )", which is located at lines 30 and 31. Since lines 30 and 31 are associated with a flag indicating that the lines were not executed, it is determined that unreferenced method "getChange( )" was not executed by production system 340. The method "getChange( )" is therefore identified as a non-executed and non-referenced method at S260.

The above process repeats at S260 for all non-referenced methods identified at S230. Flow then proceeds from S270 to S280 in the present example since a non-executed and non-referenced method was identified at S260.

At S280, the code artifact is modified to remove the non-executed and non-referenced methods identified at S260. For example, IDE 320 may present the developer with a list of unused methods and corresponding line numbers. The developer may then delete (or comment out) the lines of the unused methods at S280 to generate a modified code artifact.

Flow returns to S220 from S280 and repeats as described above. Repeating the flow allows for the identification of methods of the modified code artifact which may now be non-referenced as a result of the removal of methods at S280. For example, the removal of identified non-executed and non-referenced method "getChange( )" from code 500 results in removal of node 410 from graph 400. Consequently, node 430 now represents a non-referenced method which will be identified in a second iteration of S230. Process 200 may cycle in this manner until either no non-referenced methods are identified at S230 or no non-executed and non-referenced methods are identified at S260.

Figure 6:
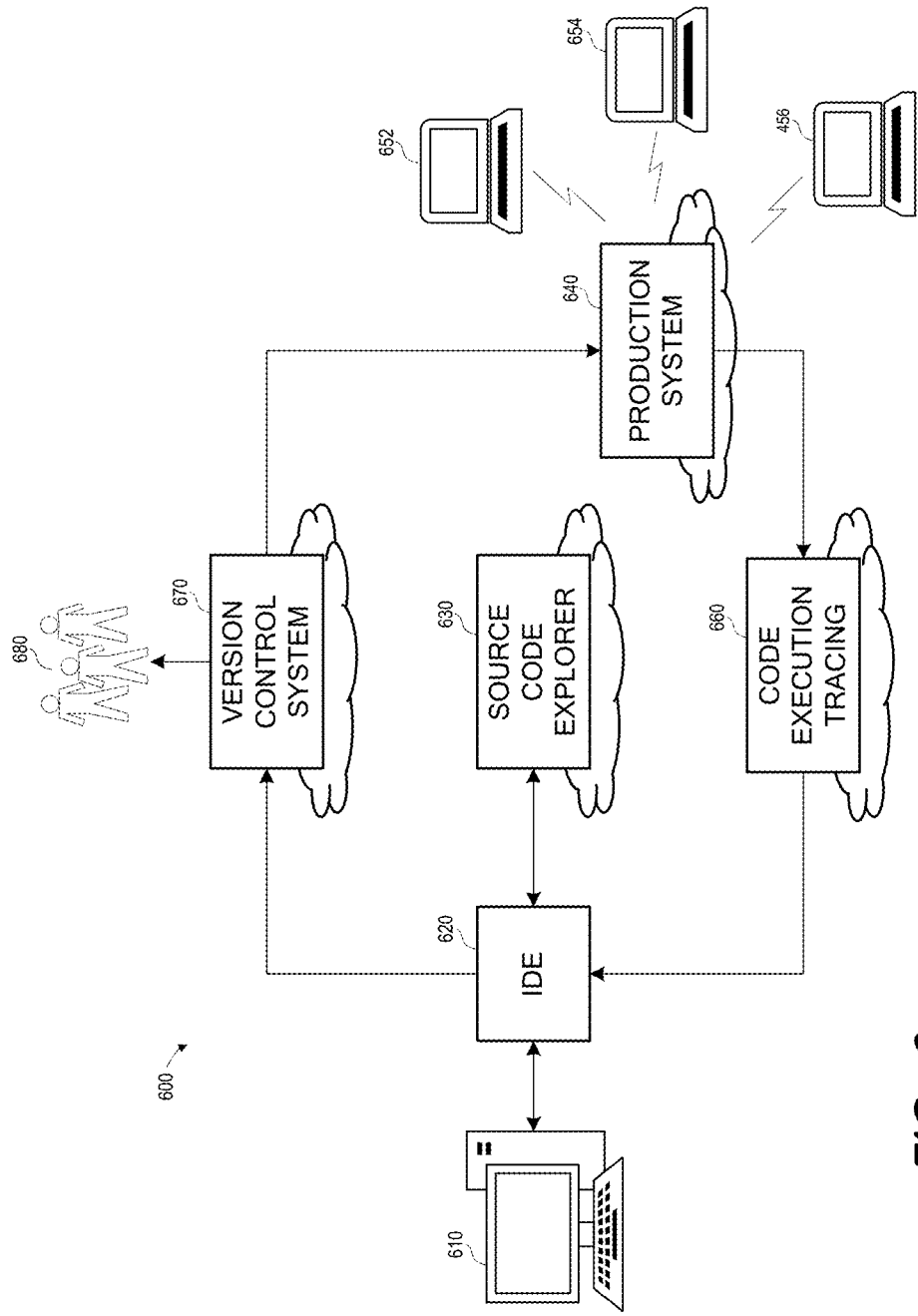
FIG. 6 illustrates a hardware landscape to automatically modify source code based on identified unused methods according to some embodiments.

FIG. 6 is a diagram of system 600 implementing process 200 according to some embodiments. System 600 may also or alternatively comprise an implementation of architecture 100 of FIG. 1. System 600 may facilitate automatic removal of methods from the code artifact at S280. Moreover, system 600 may operate to automatically check-in the modified code artifact to a version control system.

Version control system 670 is depicted as cloud-based and may include a code repository. Version control system 670 runs automated checks on code artifacts checked in to system 670 and also provides a workflow including manual review by code reviewers 680. According to some embodiments, IDE 620 automatically (i.e., without developer intervention) removes methods identified at S260 from a code artifact and checks-in the modified code artifact to version control system. Consequently, the workflow of version control system 670 may operate to incorporate the modified code artifact into production system 640. Accordingly, once a developer identifies a code artifact at S210, process 200 may execute without manual intervention to modify the code artifact and incorporate the modified code artifact into production system 640.

Figure 7:
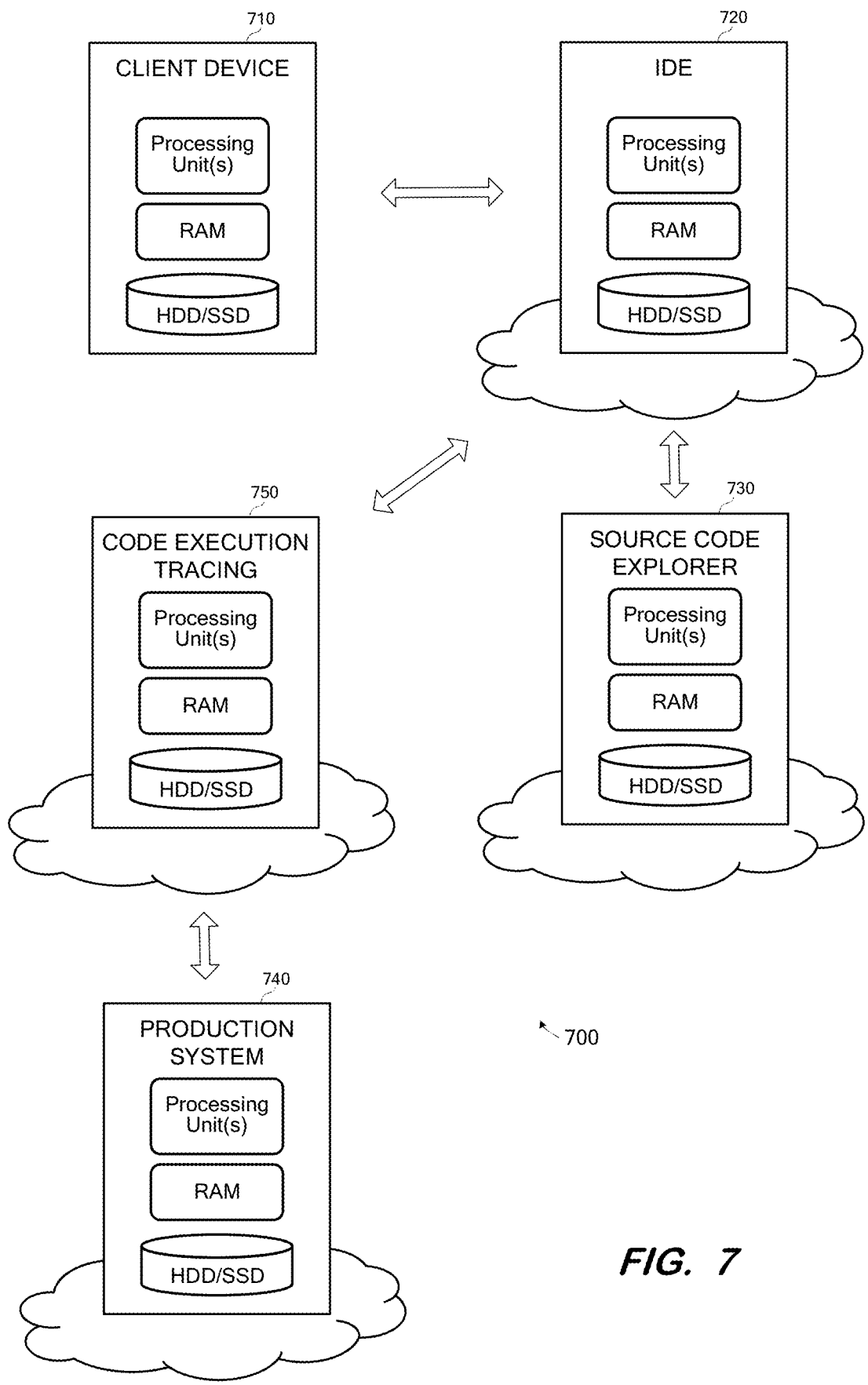
FIG. 7 is a block diagram of cloud-based hardware implementing a system according to some embodiments.

FIG. 7 is a block diagram of cloud-based system 700 according to some embodiments. System 700 may comprise an implementation of systems 300 or 600. Each of IDE 720, source code explorer 730, production system 740 and code execution tracing system 750 may comprise cloud-based compute resources, such as virtual machines, allocated by a public cloud provider providing self-service and immediate provisioning, autoscaling, security, compliance and identity management features.

Client device 710 may interact with user interfaces of a service or application of IDE 720, for example via a Web browser executing on client device 710. These user interfaces may provide the ability to write source code, identify a code artifact, and initiate a dead code identification process.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architectures described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid-state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a storage device storing a code artifact; and
   a processor to execute processor-executable program code stored on the storage device to cause the system to:
   identify the code artifact;
   determine logical entities of the code artifact;
   determine references between the logical entities of the code artifact;
   based on the determined references, identify at least one non-referenced method of the code artifact, where the at least one non-referenced method is referenced by no logical entities of the code artifact;
   identify at least one non-executed method of the at least one non-referenced method which was not executed by a production system, by searching a code execution trace for each of the at least one non-referenced method; and
   automatically modify the code artifact to remove the at least one non-executed method of the at least one non-referenced method.

2. A system according to claim 1, wherein the code execution trace is generated based on usage logs of the production system and wherein the methods are executed by the production system due to execution of software comprising the code artifact.

3. A system according to claim 1, wherein determination of the logical entities comprises determination of nodes of a graph generated based on the code artifact,
   wherein determination of references between the logical entities of the code artifact comprises determination of edges between the nodes of the graph; and
   wherein identification of the at least one non-referenced method of the code artifact that is referenced by no logical entities of the code artifact comprises determination of the nodes of the graph which represent methods and determination of ones of the nodes of the graph which represent methods which are not associated with an incoming edge.

4. A system according to claim 1, the processor to execute processor-executable program code stored on the storage device to cause the system to:
   automatically submit the modified code artifact to a version control system.

5. A system according to claim 1, the processor to execute processor-executable program code stored on the storage device to cause the system to:
   determine second logical entities of the modified code artifact;
   determine second references between the second logical entities of the modified code artifact;
   based on the determined second references, identify a second at least one non-referenced method of the code artifact, where the second at least one non-referenced method is referenced by no logical entities of the modified code artifact; and
   identify a second at least one non-executed method of the second at least one non-referenced method which was not executed by the production system, by searching a second code execution trace for each of the second at least one non-referenced method.

6. A system according to claim 5, the processor to execute processor-executable program code stored on the storage device to cause the system to:
   automatically modify the modified code artifact to remove the at least one non-executed method of the second at least one non-referenced method which was not executed by the production system; and automatically submit the automatically-modified modified code artifact to a version control system.

7. A computer-implemented method comprising:

identifying a code artifact;

determining logical entities of the code artifact;

determining references between the logical entities of the code artifact;

based on the determined references, identifying at least one non-referenced method of the code artifact, where the at least one non-referenced method is referenced by no logical entities of the code artifact;

identifying at least one non-executed method of the at least one non-referenced method which was not executed by a production system, by searching a code execution trace for each of the at least one non-referenced method; and automatically modifying the code artifact to remove the at least one non-executed method of the at least one non-referenced method.

8. A method according to claim 7, wherein the code execution trace is generated based on usage logs of the production system and wherein the methods are executed by the production system due to execution of software comprising the code artifact.

9. A method according to claim 7, wherein determining the logical entities comprises determining nodes of a graph generated based on the code artifact, wherein determining references between the logical entities of the code artifact comprises determining edges between the nodes of the graph; and wherein identifying the at least one non-referenced method of the code artifact comprises determining the nodes of the graph which represent methods and determining ones of the nodes of the graph which represent methods which are not associated with an incoming edge.

10. A method according to claim 7, further comprising:

automatically submitting the modified code artifact to a version control system.

11. A method according to claim 7, further comprising:

determining second logical entities of the modified code artifact;

determining second references between the second logical entities of the modified code artifact;

based on the determined second references, identifying a second at least one non-referenced method of the code artifact, where the second at least one non-referenced method is referenced by no logical entities of the modified code artifact;

identifying at least one non-executed method of the at least one non-referenced method which was not executed by the production system, by searching a second code execution trace for each of the second at least one non-referenced method.

12. A method according to claim 11, further comprising:

automatically modifying the modified code artifact to remove the at least one non-executed method of the at least one non-referenced method; and automatically submitting the automatically-modified modified code artifact to a version control system.

13. A non-transitory medium storing processor-executable program code, the program code executable to cause a system to:

identify a code artifact;

determine logical entities of the code artifact;

determine references between the logical entities of the code artifact;

based on the determined references, identify at least one non-referenced method of the code artifact, where the at least one non-referenced method is referenced by no logical entities of the code artifact;

identify at least one non-executed method of the at least one non-referenced method which was not executed by a production system, by searching a code execution trace for each of the at least one non-referenced method; and automatically modifying the code artifact to remove the at least one non-executed method of the at least one non-referenced method.

14. A medium according to claim 13, wherein the code execution trace is generated based on usage logs of the production system and wherein the methods are executed by the production system due to execution of software comprising the code artifact.

15. A medium according to claim 13, wherein determination of the logical entities comprises determination of nodes of a graph generated based on the code artifact, wherein determination of references between the logical entities of the code artifact comprises determination of edges between the nodes of the graph; and wherein identification of at least one non-referenced method of the code artifact comprises determination of the nodes of the graph which represent methods and determination of ones of the nodes of the graph which represent methods which are not associated with an incoming edge.

16. A medium according to claim 13, the program code executable to cause a system to:

automatically submit the modified code artifact to a version control system.

17. A medium according to claim 13, the program code executable to cause a system to:

determine second logical entities of the modified code artifact;

determine second references between the second logical entities of the modified code artifact;

based on the determined second references, identify a second at least one non-referenced method of the code artifact, where the second at least one non-referenced method is referenced by no logical entities of the modified code artifact; and identify a second at least one non-executed method of the second at least one non-referenced method which was not executed by the production system, by searching a second code execution trace for each of the second at least one non-referenced method.

* * * * *